I. H. SPENCER.
VALVE.
APPLICATION FILED JULY 2, 1912.
1,118,594.
Patented Nov. 24, 1914.
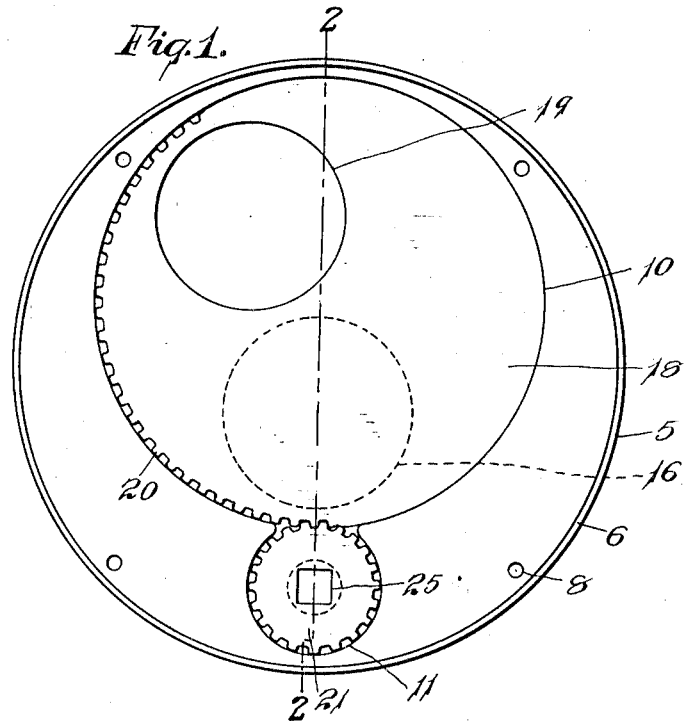
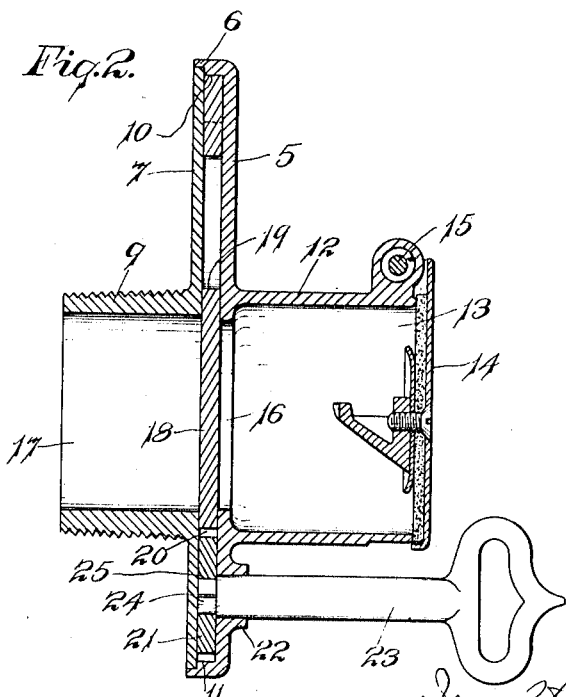
WITNESSES:
E. F. Eaton
Louis Lucia
INVENTOR.
Ira H. Spencer.
BY
Arthur B. Jenkins
ATTORNEY.

UNITED STATES PATENT OFFICE.

IRA H. SPENCER, OF WEST HARTFORD, CONNECTICUT, ASSIGNOR TO THE SPENCER TURBINE CLEANER COMPANY, OF HARTFORD, CONNECTICUT, A CORPORATION OF CONNECTICUT.

VALVE.

1,118,594.  Specification of Letters Patent.  Patented Nov. 24, 1914.

Application filed July 2, 1912. Serial No. 707,175.

*To all whom it may concern:*

Be it known that I, IRA H. SPENCER, a citizen of the United States, and a resident of West Hartford, in the county of Hartford and State of Connecticut, have invented a new and Improved Valve, of which the following is a specification.

My invention relates to the class of devices above named and an object of my invention, among others, is to provide a valve of simple construction, efficient in operation, and one that may be conveniently opened and closed.

One form of device embodying my invention and in the construction and use of which the object herein set out, as well as others, may be attained is illustrated in the accompanying drawings, in which—

Figure 1 is a view in end elevation of a part of my improved valve, the cover plate being removed. Fig. 2 is a view in lengthwise central section through my improved valve, on the dotted line 2—2 in Fig. 1.

In the use of pneumatic apparatus, and especially those in which the force created by a vacuum is employed and in which the mouths of (more especially stationary) tubes are normally closed by valves, when the mouths of such tubes are open for any purpose an objectionable noise results from the rapid inflow of air to the tube. By the construction and use of my improved device this objectionable feature is avoided, such device being shown in the accompanying drawings in which the numeral 5 indicates the body part of the valve constructed with an annular lip or rim 6 forming a recess within which a cover plate 7 is located, this plate being secured in any suitable manner, as by means of screws fitting screw threaded openings 8 in the body part. A nipple 9 extends from the cover plate 7, this nipple being preferably threaded to fit a threaded opening in a pipe to which the valve as a whole may be secured.

The body part 5 may be of any desired form, preferably circular, as shown in Fig. 1, and on its rear face it is counterbored to form a valve recess 10. It is further counterbored to form a pinion recess 11, the two recesses intersecting or cutting one into the other. A projection 12 extends from the front face of the body part and contains an inlet chamber 13 by means of which a hose or like tubular conductor may be attached by insertion therein. This chamber is closed by a valve 14 pivotally mounted at 15 for the purpose. This valve may be of any suitable form and construction. An opening 16 extends through the body part from the chamber 13 to the passage 17 in the nipple 9. A valve 18 is formed to nicely fit the recess 10, this valve being of disk form and having a port 19 extending therethrough and so located as to register with the opening 16 when the valve is in one position, the opening and port being shown out of register in the drawings herein. The edge of the valve is formed with teeth 20 to mesh with the teeth of a pinion 21 formed to fit within the recess 11. The teeth 20 on the valve 18 extend for a portion only about the periphery of said valve, they preferably being located to such an extent as to form a stop, as clearly shown in Fig. 1 of the drawing, so that when the pinion 21 is turned from the position shown in Fig. 1 it moves the valve to the opposite limit of its throw at which time the pinion will mesh with the teeth at the opposite end of the threaded section and the port 19 will register with the opening 16. This construction enables the production of a valve that will project from the surface on which it is supported to a minimum degree, the valve body having a flat bearing surface on its back face with recesses to receive a valve of disk form, the body, that receives the valve including the cover plate 7, being extremely thin and the valve and its actuating means also being extremely thin and flat, so that so far as this structure is concerned but slight thickness is required and applicant is thus enabled to provide a structure having a double valve that shall project to a minimum degree. A hub 22 is formed on the base of the body part to provide a bearing for a key 23 the end 24 of which is of noncircular shape to fit a noncircular shaped opening 25 in the pinion 21 and by means of which the pinion is turned to operate the valve 18.

In the embodiment of my invention illustrated herein the device shown is particularly applicable for use in pneumatic apparatus used in cleaning operations and when so used the valve 18 being normally closed the valve 14 is opened to permit a hose or other tubular conductor to be inserted within the chamber 13 by means of which said hose is attached to the device. The valve 18 being closed no air can flow through the device and the objectionable noises do not therefore result. After the hose has been secured in place the valve 18 is opened by turning the pinion 21 by means of the key 23 and the operation is reversed when it is desired to remove the tube.

When an apparatus, of which valves similar to 14 form a part of, is in operation it is essential that all valves not in use shall be tightly closed, and with proper construction the suction of the apparatus when in operation will hold the valve tightly closed against the inflow of air. It has been found however in order to avoid meddling with the valves and a consequent ill effect upon the operation of the apparatus, that a lock should be provided whereby a special implement must be employed to enable the valves to be opened. In providing these valves with such locks however the efficiency of the valve is injuriously affected and it is practically impossible to construct an airtight valve of this class and at the same time provide it with a lock.

In the device herein shown and described I have provided means whereby the valves are guarded against unauthorized operation and at the same time the valve 14 is maintained in a perfectly tight condition, and I effect this result by providing the valve 18 with means whereby a special implement must be employed to open it, the valve 14 hanging normally in a position to tightly close upon the presence of a suction.

While I have shown and described herein one form of device embodying the invention, I do not limit the latter to a valve constructed in exact accordance with that herein illustrated.

I claim—

1. A valve casing including a body composed of two plates and having a flat bearing surface on its back face, recesses to receive a valve and an opening into one of said recesses, a valve member in one of said recesses to regulate flow through said opening, an actuating member located in the other recess, a projection from the front face of the body having an opening registering with that through the body, and a valve to close the mouth of said projection.

2. A valve casing including a body composed of two plates and having a flat bearing surface at its back, an opening through the body, and recesses, one of which registers with said opening, a valve member located in one of said recesses to control flow through said opening, an operating member located in the other recess, the latter recess opening to the front face of the body for the reception of an actuating tool, a projection from the front face of the body having an opening registering with that through the body, and a valve to close the mouth of said projection.

IRA H. SPENCER.

Witnesses:
H. H. RICHARDSON,
JOHN J. TOTTEN.